(12) United States Patent
Pasumarthy

(10) Patent No.: US 10,795,965 B2
(45) Date of Patent: Oct. 6, 2020

(54) DISTRIBUTED IN-BROWSER DEEP LEARNING FOR PREDICTIVE PRE-FETCHING

(71) Applicant: Microsoft Technology Licensing, LLC, Redmond, WA (US)

(72) Inventor: Nitin Pasumarthy, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 15/941,305

(22) Filed: Mar. 30, 2018

(65) Prior Publication Data

US 2019/0303504 A1 Oct. 3, 2019

(51) Int. Cl.
| | |
|---|---|
| *G06F 15/16* | (2006.01) |
| *G06F 16/957* | (2019.01) |
| *G06N 3/08* | (2006.01) |
| *G06Q 50/00* | (2012.01) |
| *G06F 21/62* | (2013.01) |
| *G06N 3/04* | (2006.01) |

(52) U.S. Cl.
CPC ........ *G06F 16/9574* (2019.01); *G06F 21/629* (2013.01); *G06N 3/0454* (2013.01); *G06N 3/08* (2013.01); *G06Q 50/01* (2013.01)

(58) Field of Classification Search
CPC . G06F 16/9574; G06F 21/629; G06N 3/0454; G06N 3/08; G06Q 50/01
USPC .......................... 709/203, 219, 223, 226, 247
See application file for complete search history.

(56) References Cited

U.S. PATENT DOCUMENTS

| | | | | |
|---|---|---|---|---|
| 7,921,292 | B1* | 4/2011 | Pauker | H04L 9/083 713/171 |
| 8,069,406 | B2* | 11/2011 | Weiss | H04L 67/2847 715/208 |
| 2010/0100607 | A1* | 4/2010 | Scholz | G06Q 30/02 709/219 |
| 2011/0202598 | A1* | 8/2011 | Evans | G06Q 10/107 709/203 |
| 2012/0042264 | A1* | 2/2012 | Burckart | G06Q 30/0255 715/753 |
| 2015/0293918 | A1* | 10/2015 | Whitmyer, Jr. | G06F 16/24578 707/730 |
| 2017/0199857 | A1* | 7/2017 | Greiner | G06N 20/00 |
| 2017/0357650 | A1* | 12/2017 | de Almeida Forjaz de Lacerda | G06F 16/95 |
| 2018/0144265 | A1* | 5/2018 | Bonawitz | G06N 20/00 |
| 2018/0262924 | A1* | 9/2018 | Dao | H04W 72/1257 |

(Continued)

*Primary Examiner* — Kaylee J Huang
(74) *Attorney, Agent, or Firm* — Hickman Palermo Becker Bingham LLP

(57) ABSTRACT

Techniques for distributed processing and pre-fetching content using an in-browser neural network model are disclosed herein. In some embodiments, a server transmits a neural network model to a client device, where the neural network model is stored a persistent store of a browser on the client device, and, during a networking session in which the browser on the client device is accessing a page of an online service, the client device predicts at least one link from a plurality of links on the page using the stored neural network model. The client device then fetches content associated with the predicted link(s) from a server of the online service prior to any selection of the predicted link(s) during the networking session.

20 Claims, 13 Drawing Sheets

(56) References Cited

U.S. PATENT DOCUMENTS

2019/0068733 A1\* 2/2019 Lewis ................... H04L 67/26
2019/0361942 A1\* 11/2019 Guo ..................... G06F 16/972

\* cited by examiner

DISTRIBUTED IN-BROWSER DEEP LEARNING FOR PREDICTIVE PRE-FETCHING

TECHNICAL FIELD

The present application relates generally to systems, methods, and computer program products for distributed processing and pre-fetching content using an in-browser neural network model.

BACKGROUND

When a browser of a client device accesses a page, such as a web page, via a network connection, it is common for technical problems to arise when the browser attempts to retrieve content of the page from the server hosting the page for display to the user of the browser. For example, at the time the browser attempts to retrieve the content, the quality of the network connection between the client device and the server may be poor or the server may be overloaded with servicing other requests from other client devices, causing the loading of the content in the browser to be delayed or altogether prevented. Other technical problems may arise as well.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
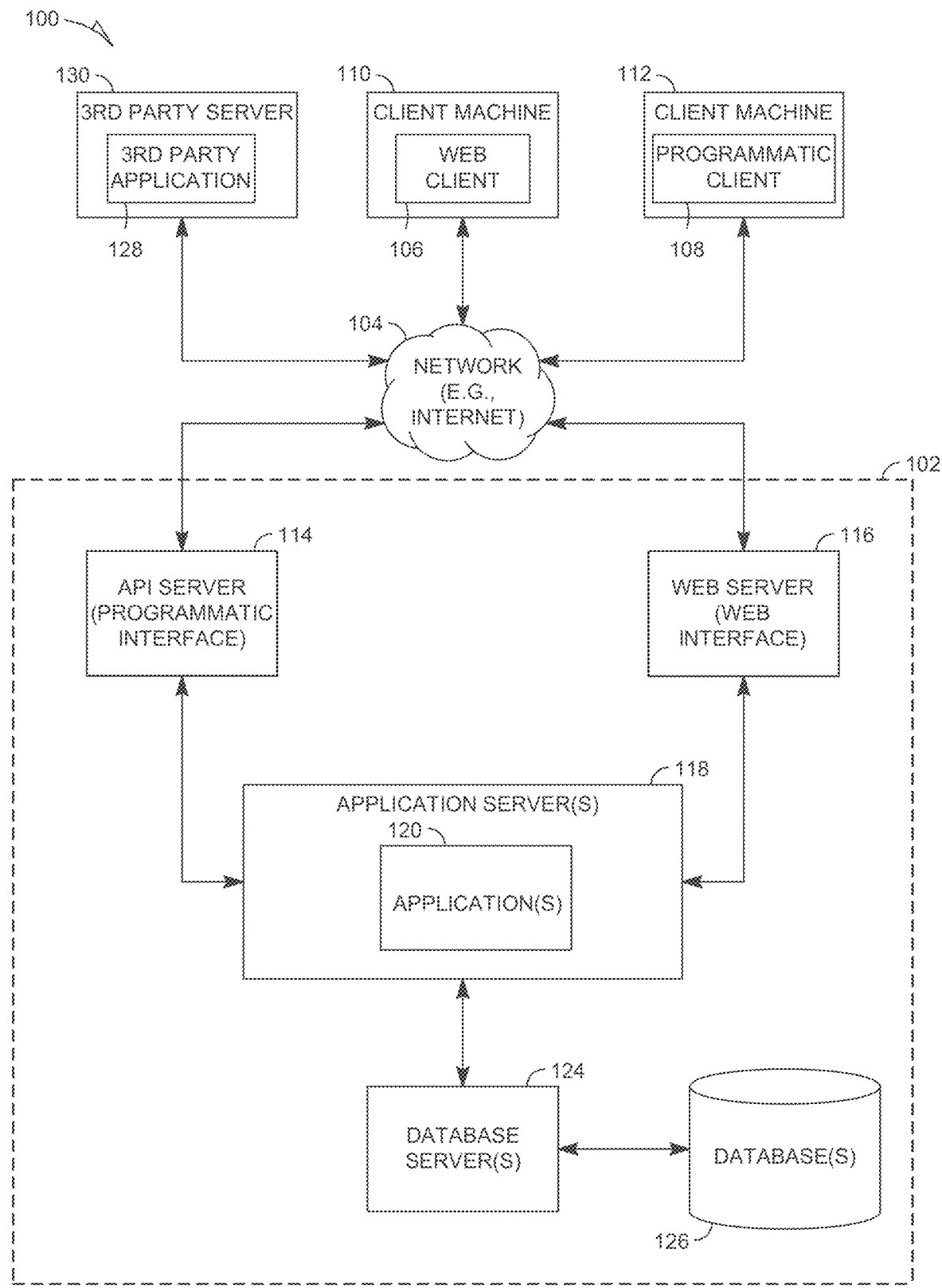
FIG. 1 is a block diagram illustrating a client-server system, in accordance with an example embodiment.

Example methods and systems of pre-fetching content using an in-browser neural network model in order to improve page content retrieval and load time, and to mitigate issues associated with poor network connectivity are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. Some technical effects of the system and method of the present disclosure are to enable a computer system to pre-fetch content using an in-browser neural network model, thereby reducing a client device's retrieval and load time of content from a server and avoiding poor network connectivity issues. Additionally, other technical effects will be apparent from this disclosure as well, including, but not limited to, reducing the workload of a server by running a neural network on client devices instead of the server, and increasing data security and privacy for a user by training a neural network model in a personalized manner for the user on a client device of the user using behavior data of the user rather than revealing the association of the behavior data with the user by training the neural network model in a personalized manner for the user using the behavior data on the server.

In some example embodiments, a technique for predicting a user's behavior on the user's client device is implemented in a browser of the client device using a neural network model that is installed, stored, trained, and used in the browser of the client device, where the neural network model is used to predict, select, or otherwise identify content that the user is likely to request. The technique includes fetching the content prior to the user requesting the content.

In some example embodiments, operations are performed by a computer system (or other machine) having a memory and at least one hardware processor, with the operations comprising generating a first message comprising a neural network model and first initialization instructions, the first initialization instructions being configured to cause a first client device of a first user to: store the neural network model in a persistent store of a browser on the first client device; during a networking session in which the browser on the first client device is accessing a page of an online service, predict (or select or otherwise identify) at least one link from a plurality of links on the page using the neural network model stored in the persistent store of the browser, and fetch content associated with the predicted link(s) front a server of the online service prior to any selection of the predicted link(s) during the networking session; and transmitting the first message to the first client device via a network.

In some example embodiments, the first initialization instructions are further configured to cause the first client device to train the neural network model using behavior data of the first user without transmitting the behavior data to a location external to the first client device, with the behavior data comprising indications of online content displayed to the first user within the browser and indications of actions of the first user with the online content within the browser. In some example embodiments, the first initialization instructions are further configured to cause the first client device to perform the training of the neural network model within a worker thread of the browser. In some example embodiments, the first initialization instructions are further configured to cause the first client device to: encrypt the trained neural network model using a public key; and transmit a second message to a second client device of a second user that does not have access to the public key, the second message comprising the encrypted trained neural network model and one or more transmission instructions configured to cause the second client device to transmit the encrypted trained neural network model to a server of the online service.

In some example embodiments, the first initialization instructions are further configured to cause the first client device to transmit a second message comprising a second neural network model trained and encrypted by a second client device of a second user to a server of the online service based on the first client device receiving the second encrypted trained neural network model from the second client device. In some example embodiments, the computer system comprises the server of the online service, the neural network model in the first message transmitted to the first client device comprises a population neural network model stored on the server of the online service, and the operations further comprise: decrypting the second encrypted trained neural network model using a public key; modifying the population neural network model based on the decrypted trained neural network model; generating a third message comprising the modified population neural network model; and transmitting the third message to a third client device of a third user via the network.

In some example embodiments, the first initialization instructions are further configured to cause the first client device to: receive a plurality of content items from the server of the online service, the plurality of content items (e.g., search results) having a ranking associated with them as received from the server; modify the ranking of the plurality of content items using the neural network model stored in the persistent store of the browser; and display at least a portion of the content items based on the modified ranking.

In some example embodiments, the neural network model comprises a deep neural network model. In some example embodiments, the client device comprises a mobile device. In some example embodiments, the online service comprises a social networking service. In some example embodiments, the content comprises at least one of a page, a document, textual data, image data, video data, and audio data.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processor to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form pan of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interlace provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
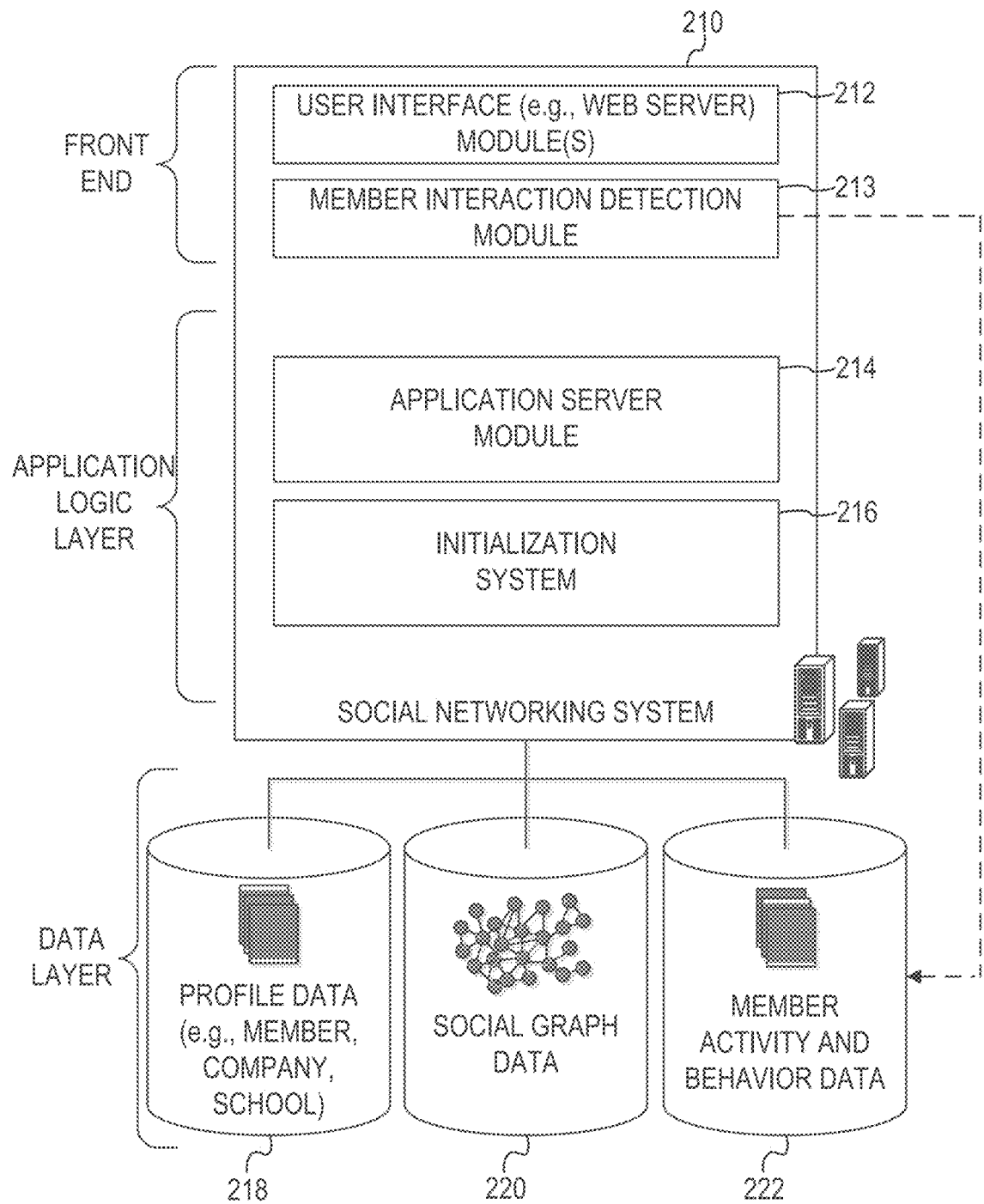
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a initialization system 216, for use in social networking system 210, consistent with some embodiments of the present disclosure. In some embodiments, the initialization system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interlace module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the initialization system 216.

As shown in FIG. 2, a data layer may include several databases, such as a database 218 for storing profile data, including both member profile data and profile data for various organizations (e.g., companies, schools, etc). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the initialization system 216. The members' interactions and behavior may also be tracked, stored, and used by a pre-fetch system 400 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the initialization system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
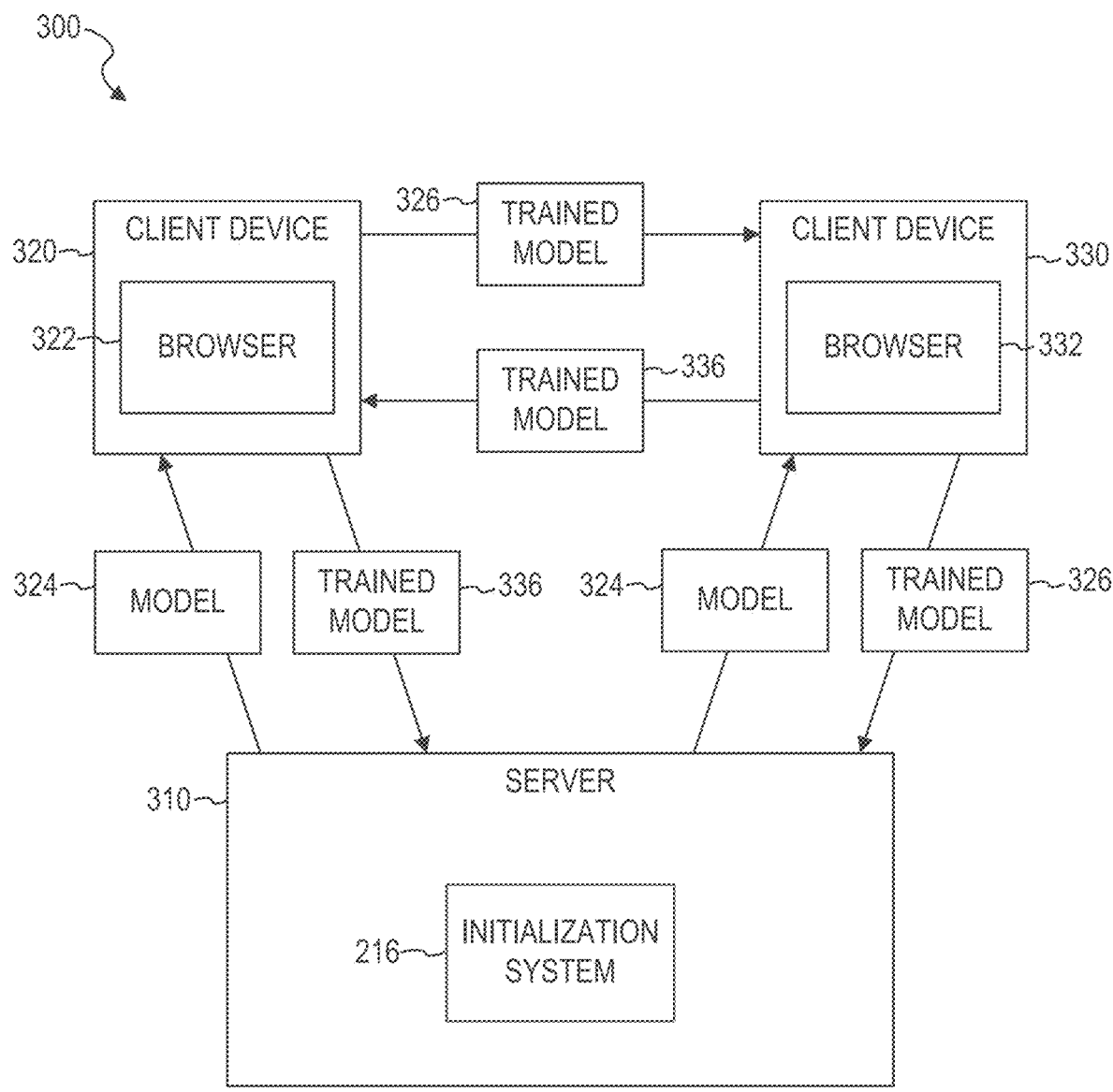
FIG. 3 is a block diagram illustrating a distributed processing environment, in accordance with an example embodiment.

FIG. 3 is a block diagram illustrating a distributed processing environment 300 in which features and functions of the present disclosure may be implemented, in accordance with an example embodiment. In some example embodiments, the distributed processing environment 300 comprises a server 310 and a plurality of client devices, such as client devices 320 and 330, which may all communicate with one another via a network (not shown). The network may be a wired network, a wireless network (e.g., a mobile or cellular network), or any suitable combination thereof. The network may include one or more portions that constitute a private network, a public network (e.g., the Internet), or any suitable combination thereof. Accordingly, the network may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or a WiMax network), or any suitable combination thereof.

Although FIG. 3 shows only two client devices 320 and 330, it is contemplated that more than two client devices may be included in the distributed processing environment 300. The client devices 320 and 330 may comprise any client-side computing devices, such as the client machine 110 or the client machine 112 in FIG. 1, and may include, but are not limited to, mobile devices (e.g., smartphones, tablet computers, wearable devices), desktop computers, and laptop computers. In some example embodiments, the client devices 320 and 330 comprise browsers 322 and 332, respectively. The browsers 322 and 332 may comprise any web browser for retrieving, presenting and traversing information resources on the Internet (e.g., web pages).

In some embodiments, the server 310 comprises the initialization system 216, which may comprise any combination of one or more modules and one or more databases. The module(s) and the database(s) of the initialization system 216 can reside on a computer system (e.g., the server 310), or other machine, having a memory and at least one processor. In some embodiments, the module(s) and the database(s) of the initialization system 216 can be incorporated into the application server(s) 118 in FIG. 1. In some example embodiments, the database(s) of the initialization system 216 is incorporated into database(s) 126 in FIG. 1 and can include any combination of one or more of databases 218, 220, and 222 in FIG. 2. However, it is contemplated that other configurations of the module(s) of the initialization system 216, as well as the database(s) of the initialization system 216, are also within the scope of the present disclosure.

In some example embodiments, the initialization system 216 stores a neural network model 324, and transmits the neural network model 324 to the client devices 320 and 330. In some example embodiments, the neural network model 324 is a deep neural network (DNN) model. However, it is contemplated that other types of neural network models may be employed. In some example embodiments, the neural network model 324 is received by the client devices 320 and 330, and then stored in persistent stores of their respective browsers 322 and 332. In some example embodiments, the neural network model 324 is configured to, during a networking session in which the browser in which the neural network model 324 is stored is accessing a page of an online service, predict at least one link from a plurality of links on the page. The initialization system 216 may also transmit initialization instructions (not shown) to the client devices 320 and 330, and the initialization instructions may be configured to cause the client devices to store the neural network model 324 in the persistent stores of their respective browsers 322 and 332, use the neural network model 324 to predict, select, or otherwise identify at least one link from a plurality of links on a page, and fetch content associated with the predicted link(s) from a server of the online service, such as the server 310, prior to any selection of the predicted link(s) during the networking session in which the browser in which the neural network model 324 is stored is accessing the page.

Figure 4:
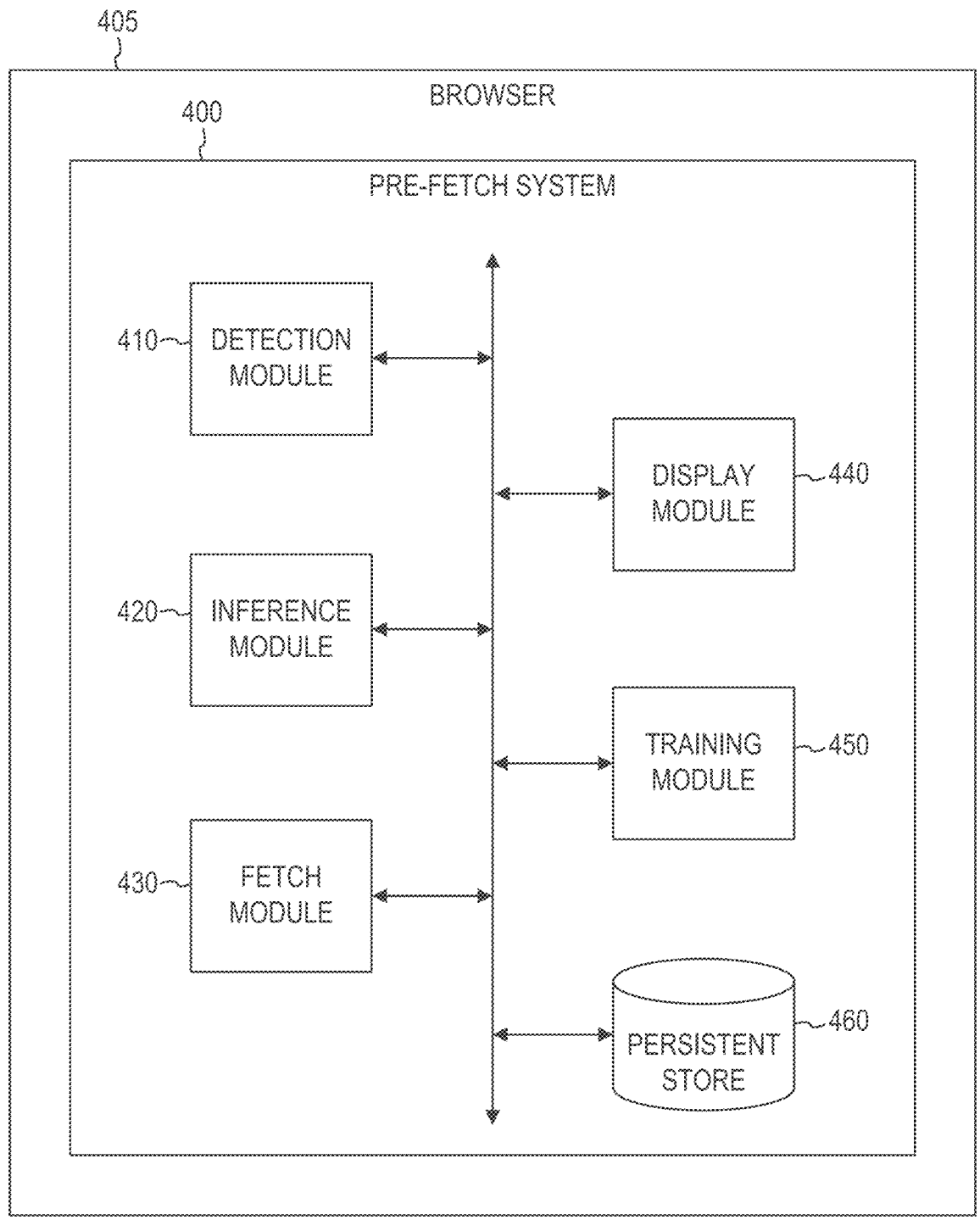
FIG. 4 is a block diagram illustrating a pre-fetch system implemented in a browser of a client device, in accordance with an example embodiment.

FIG. 4 is a block diagram illustrating a pre-fetch system 400 implemented in a browser 405 of a client device (e.g., browser 322 of client device 320 or browser 332 of client device 330 in FIG. 3), in accordance with an example embodiment. In some example embodiments, the pre-fetch system 400 is implemented in the browser 405 of the client device in response to, or otherwise based on, the client device receiving the neural network model and the initialization instructions that were transmitted from the server. The pre-fetch system 400 may detect that the browser 405 on the client device is accessing a page comprising a plurality of links during a networking session, predict (or select or otherwise identify) at least one link from the plurality of links using the neural network model stored in a persistent store of the browser 405, fetch content associated with the predicted link(s) from a server prior to any selection of the predicted link(s) during the networking session, and, in response to a selection of one of the predicted link(s) during the networking session, display the fetched content associated with the selected one of the predicted link(s) within the browser 405. In some embodiments, the pre-fetch system 400 comprises any combination of one or more of a detection module 410, an inference module 420, a fetch module 430, a display module 440, a training module 450, and a persistent store 460.

In some example embodiments, one or more of the modules 410, 420, 430, 440, and 450 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 410, 420, 430, 440, and 450 is configured to receive user input. For example, one or more of the modules 410, 420, 430, 440, and 450 can present one or more GUI elements (e.g., drop-down menu, selectable buttons, text field) with which a user can submit input.

In some example embodiments, one or more of the modules 410, 420, 430, 440, and 450 is configured to perform various communication functions to facilitate the functionality described herein, such as by communicating with the social networking system 210 via the network 104 using a wired or wireless connection. Any combination of one or more of the modules 410, 420, 430, 440, and 450 may also provide various web services or functions, such as retrieving information from the third party servers 130 and the social networking system 210. Information retrieved by the any of the modules 410, 420, 430, 440, and 450 may include profile data corresponding to users and members of the social networking service of the social networking system 210.

Additionally, any combination of one or more of the modules 410, 420, 430, 440, and 450 can provide various data functionality, such as exchanging information with the persistent store 460 or one or more databases of a server (e.g., server 310). For example, any of the modules 410, 420, 430, 440, and 450 can access profile data, social graph data, and member activity and behavior data from the databases 218, 220, and 222 in FIG. 2, as well as exchange information with third party servers 130, client machines 110, 112, and other sources of information.

In some example embodiments, the persistent store 460 comprises a repository of the browser and is configured to persistently store and manage collections of data. In some example embodiments, the client device receives the neural network model from the server, along with the initialization instructions, and then stores the neural network model in the persistent store 460 for later use in accordance with the initialization instructions that configure any combination of one or more of modules 410, 420, 430, 440, and 450.

In some example embodiments, the detection module 410 is configured to detect that the browser 405 on the client device is accessing a page of comprising a plurality of links during a networking session. The page may comprise a page of an online service. For example, in some example embodiments, the page comprises a page of a social networking service, such as a page of the social networking system 210 of FIG. 2. However, it is contemplated that other types of pages and online services are also within the scope of the present disclosure.

In some example embodiments, the inference module 420 is configured to, in response to or otherwise based on the detection of the browser 405 accessing the page comprising the plurality of links during the network session, predict (or select or otherwise identify) at least one link from the plurality of links on the page using the stored neural network model in the persistent store of the browser during the networking session in which the browser 405 is accessing the page.

In some example embodiments, the fetch module 430 is configured to fetch content associated with the predicted link(s) from a server of the online service prior to any selection of the predicted link(s) during the networking session. For example, the fetch module 430 may submit a request to the server for the content of the predicted link similar to if the predicted link had been selected, even though the predicted link has not yet been selected. In some example embodiments, the content comprises at least one of a page, a document, textual data, image data, video data, and audio data. However, other types of content are also within the scope of the present disclosure.

In some example embodiments, the display module 440 is configured to receive a user selection (e.g., a click or a tap) of one of the predicted link(s) from the user of the client device, and then display the fetched content within the browser 405 of the client device in response to, or otherwise based on, the selection of the one of the predicted link(s).

In some example embodiments, the training module 450 is configured to train the neural network model stored in the persistent store of the browser 405 on the client device using behavior data of the user without transmitting the behavior data to a location external to the client device. In some example embodiments, the behavior data comprises indications of online content displayed to the user within the browser 405 and indications of interactions of the user with the online content within the browser 405. Such behavior data may include indications of what links were presented to the user and indications of what links the user selected. In this respect, operation 855 may follow operation 850 and use the user selection as behavior data in training the neural network model. The behavior data may also include indications of actions (e.g., likes, comments, shares) the user has taken with respect to the fetched content that has been displayed within the browser 405. In some example embodiments, the training module 450 performs the training of the neural network model within a worker thread of the browser 405.

Figure 5A:
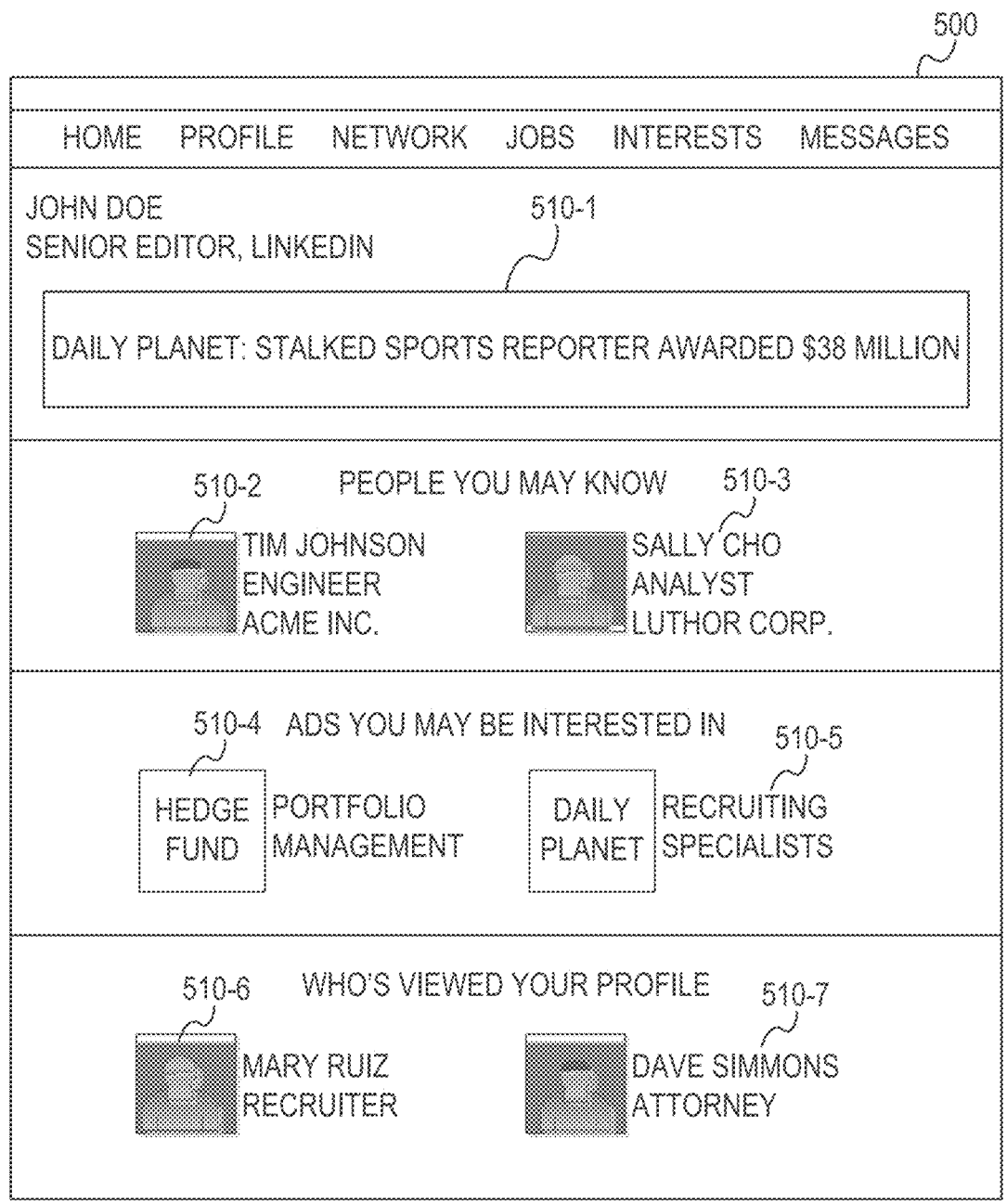
FIGS. 5A-5B illustrates a graphical user interface (GUI) at different stages of a browser using pre-fetching functionality, in accordance with an example embodiment.
Figure 5B:
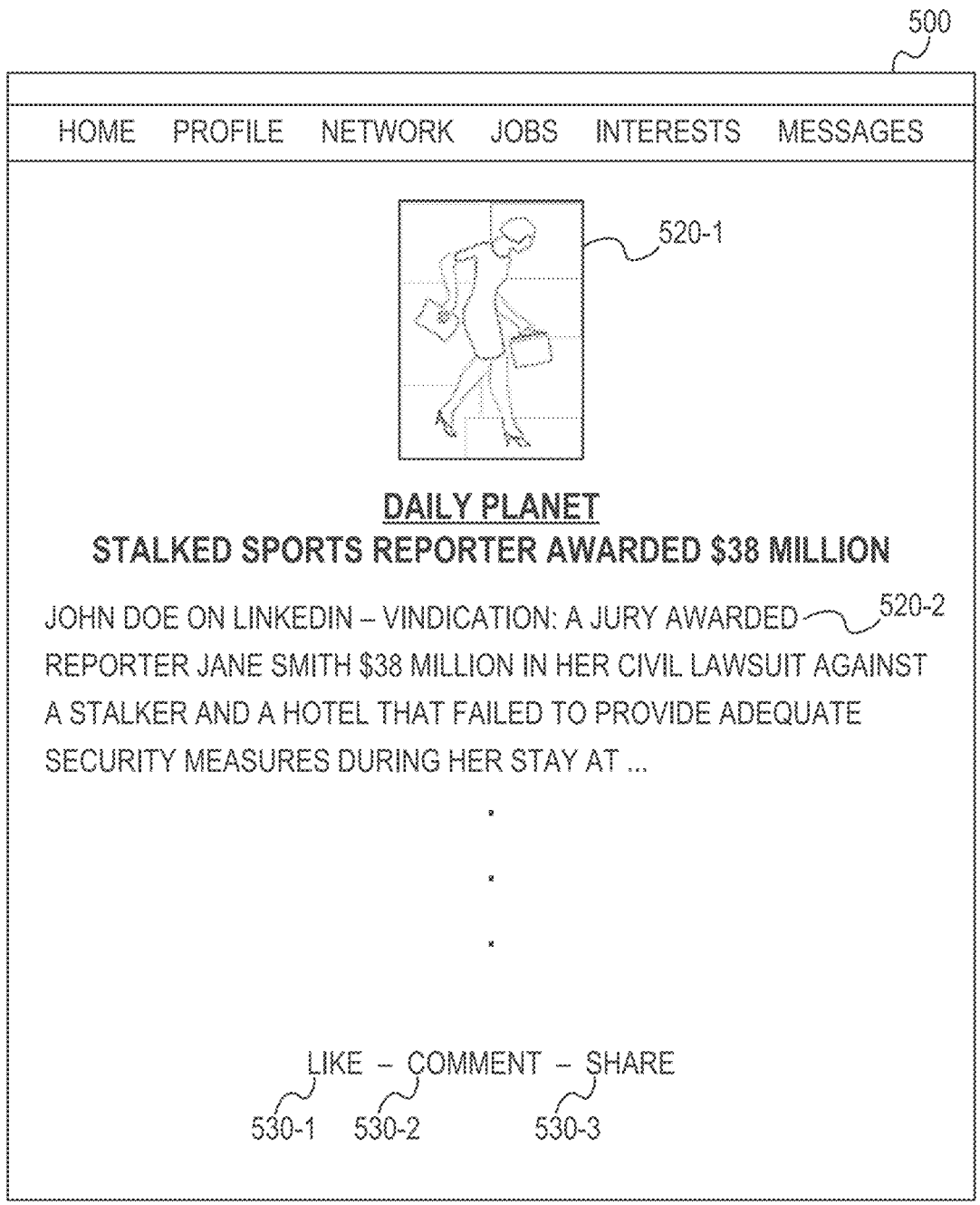

FIGS. 5A-5B illustrates a graphical user interface (GUI) 500 at different stages of a browser using pre-fetching functionality, in accordance with an example embodiment. In FIG. 5A, the GUI 500 displays a page of an online service, which comprises a plurality of selectable links 510. Different types of links may be displayed as part of the page. For example, in FIG. 5A, link 510-1 is a link to a news article, links 510-2 and 510-3 are links to other users that the user of the browser 405 in which the page is being displayed may know, links 510-4 and 510-5 are links to advertisements that the user of the browser 405 in which the page is being displayed may be interested in, and links 510-6 and 510-7 are links to other users who have viewed a social networking profile of the user of the browser 405 in which the page is being displayed.

In FIG. 5A, the detection module 410 detects that the browser 405 on the client device is accessing the page comprising the plurality of links 510 shown in the GUI 500. The inference module 420, in response to or otherwise based on the detection of the browser 405 accessing the page comprising the plurality of links 510 during the network session, predicts (or selects or otherwise identifies) at least one link 510 from the plurality of links 510 on the page shown in the GUI 500 using the stored neural network model in the persistent store 360 of the browser 405 during the networking session in which the browser 405 is accessing the page. For example, the user of the browser 405 may have corresponding behavior data that indicates that the user is interested in news articles (e.g., a history of the user selecting news articles to view, liking news articles, sharing news articles, commenting on news articles, etc.). Based on that behavior data of the user, the neural network model may have been trained in a way to predict that the user would be interested in news articles. Accordingly, taking the plurality of links 510 on the page shown in the GUI 500 as inputs into the neural network model trained to be personalized to the user, the neural network model may predict, select, or otherwise identify the link 510-1 from amongst the other links 510 on the page. The fetch module 430 may then fetch content associated with the predicted link 510-1 from a server of the online service prior to any selection by the user of the predicted link 510 during the networking session.

After the associated content has been fetched and received by the pre-fetch system 400, the display module 440 receives a user selection (e.g., a click or a tap) of the predicted link 510-1 from the user of the browser 405, and then displays the fetched content within the browser 405 in response to, or otherwise based on, the selection of the predicted link 510-1. In FIG. 5B, the display module 440 has received the user selection of the predicted link 510-1 and has displayed the fetched content 520 on a page within the GUI 500 based on the user selection of the predicted link 510-1. For example, the fetched content 510 may comprise an image 520-1 and textual data 520-2 of the news article corresponding to the predicted link 510-1. The GUI 500 in FIG. 5B may also display one or more additional links 530 configured to enable the user to perform actions regarding the fetched content 510, such as liking the fetched content 510 via a selectable "LIKE" link 530-1, commenting on the fetched content 510 via a selectable "COMMENT" link 530-2, and sharing the fetched content 510 via a selectable "SHARE" link 530-3.

The training module 450 trains the neural network model stored in the persistent store of the browser 405 using behavior data of the user without transmitting the behavior data to a location external to the client device (e.g., the server 310). In some example embodiments, the behavior data comprises indications of online content (e.g., links 510, content 520, links 530), displayed to the user within the browser 405 and indications of interactions of the user with the online content within the browser 405. Such behavior data may include indications of what links were presented to the user and indications of what links the user selected. The behavior data may also include indications of actions (e.g., likes, comments, shares) the user has taken with respect to the fetched content that has been displayed within the browser 405.

Referring back to FIG. 3, in some example embodiments, the neural network model 324 transmitted by the server 310 to the client devices 320 and 330 is a population neural network model, where is stored in browsers 322 and 332, respectively. The population neural network model is a neural network model that is configured for a full population of users, not just a single user. The transmitted instances of the population neural network model 324 may then be trained on client devices 320 and 330 separately within respective browsers 322 and 332 using the behavior data of the respective users of the client devices 320 and 330, thereby generating trained personalized neural network models 326 and 336 that are specific to the users of the client devices 320 and 330 on which they are trained. The server 310 may use these trained neural network models 326 and 336 to train and optimize the population neural network model 324 it transmits along with its initialization instructions.

However, since it is possible to infer personal information of the users of the client devices 320 and 330 on which the trained neural network models 326 and 336 are trained, a technical issue arises in terms of how to allow the server 310 to learn from the trained neural network models 326 and 336 without allowing the server 310 to discover or infer to which user the underlying behavior data belongs. In order to address this technical problem, in some example embodiments, the client device 320 encrypts and transmits its trained neural network model 326 to the client device 330, and the client device 330 transmits the encrypted trained neural network model 326 to the server 310, thereby preventing the server 310 from discovering that the underlying behavior data of the trained neural network model 326 belongs to the user of the client device 320. Similarly, in some example embodiments, the client device 330 encrypts and transmits its trained neural network model 336 to the client device 320, and the client device 320 transmits the encrypted trained neural network model 336 to the server 310, thereby preventing the server 310 from discovering that the underlying behavior data of the trained neural network model 336 belongs to the user of the client device 330.

Figure 6:
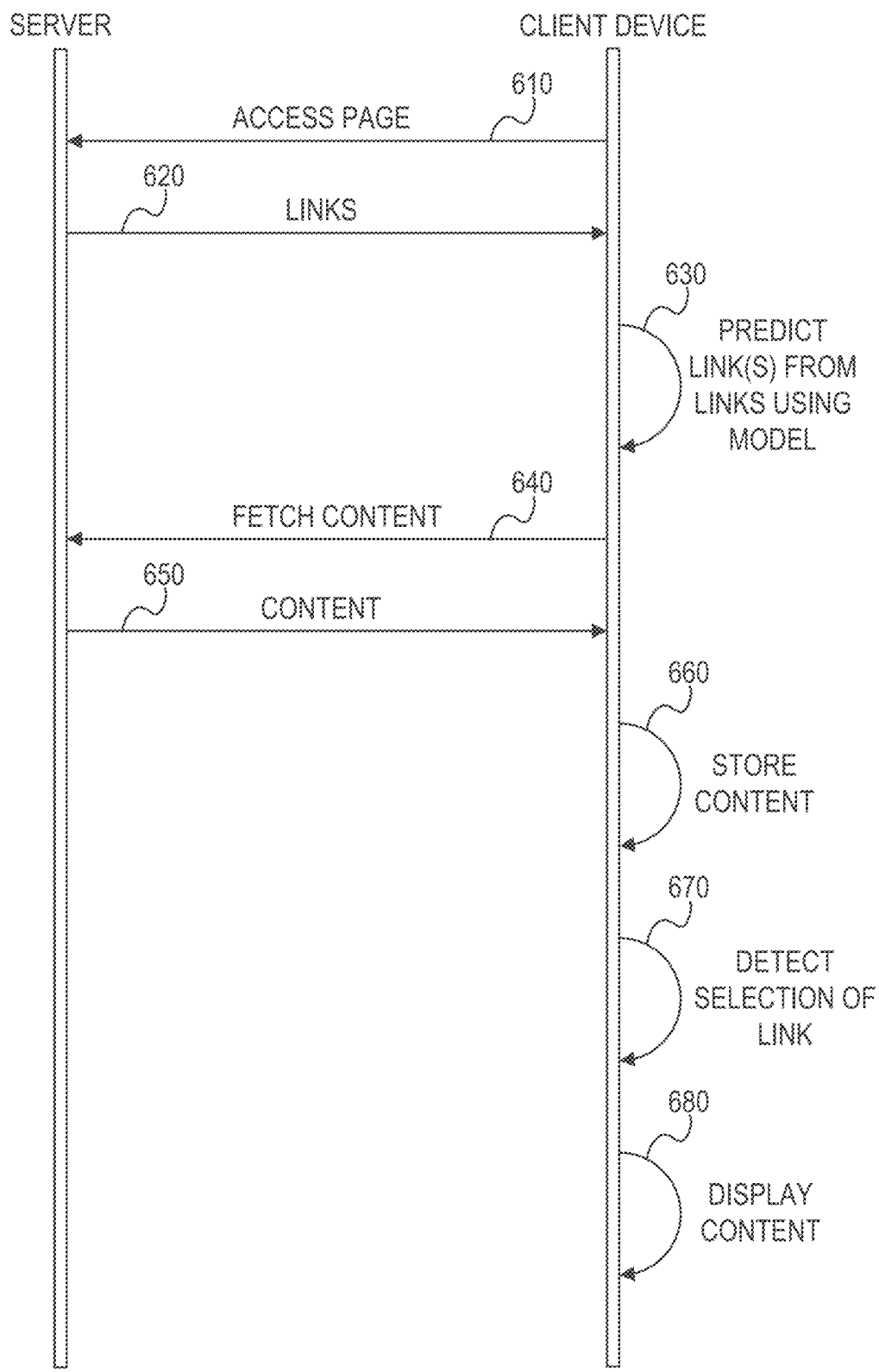
FIG. 6 is a sequence diagram illustrating a method of pre-fetching content using an in-browser neural network model, in accordance with an example embodiment.

FIG. 6 is a sequence diagram illustrating a method of pre-fetching content using an in-browser neural network model, in accordance with an example embodiment. At operation 610, a client device (e.g., the client device 320 in FIG. 3) accesses a page of an online service (e.g., via navigation to a web page) hosted on a server (e.g., the server 310 in FIG. 3). At operation 620, the client device receives, from the server, a plurality of links for display on the page within a browser on the client device. At operation 630, the client device predicts at least one link from the plurality of links using a neural network model stored in a persistent store of the browser on the client device. At operation 640, the client device fetches content associated with the predicted link(s) from the server. At operation 650, the client device receives the content from the server. At operation 660, the client device stores the fetched content for subsequent use. At operation 670, the client device detects a user selection of the predicted link(s). At operation 680, the client device displays the fetched content within the browser of the client device.

Figure 7:
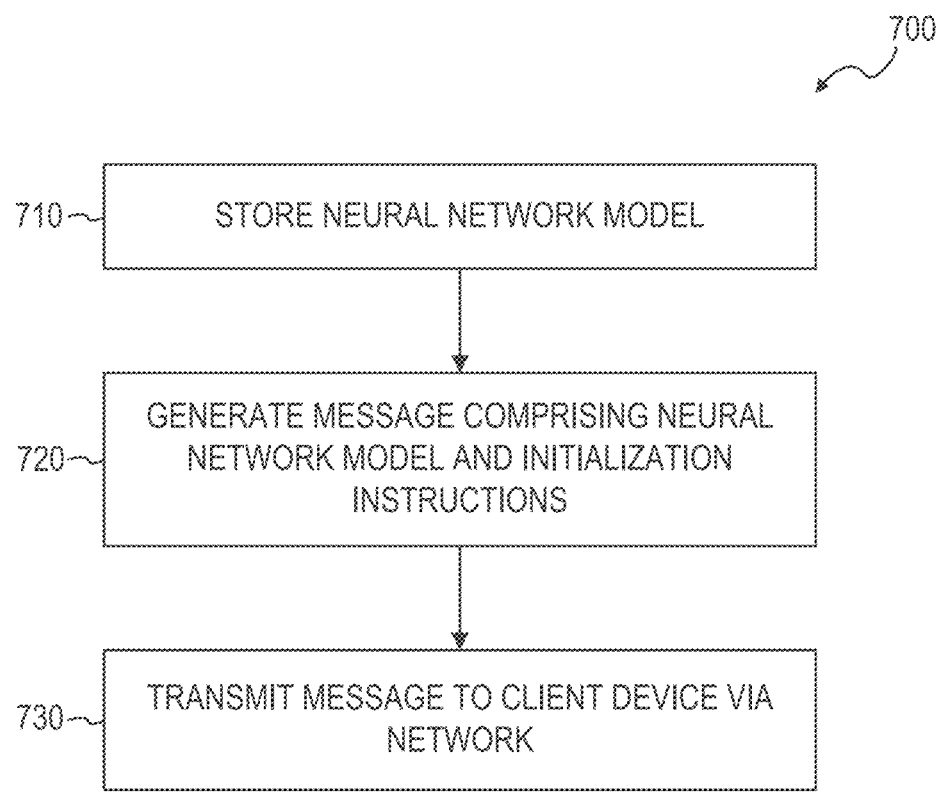
FIG. 7 is a flowchart illustrating a method of implementing a pre-fetch system, in accordance with an example embodiment.

FIG. 7 is a flowchart illustrating a method 700 of implementing a pre-fetch system, in accordance with an example embodiment. The method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the initialization system 216 of FIGS. 2-3, as described above.

At operation 710, the initialization system 216 stores a neural network model configured to predict at least one link from amongst a plurality of links. In some example embodiments, the neural network model is a deep neural network model.

At operation 720, the initialization system 216 generates a message comprising a neural network model and initialization instructions. In some example embodiments, the initialization instructions are configured to cause a client device of a user to, store the neural network model in a persistent store of a browser on the client device, to, during a networking session in which the browser on the client device is accessing a page of an online service, predict (or select or otherwise identify) at least one link from a plurality of links on the page using the neural network model stored in the persistent store of the browser, and to fetch content associated with the predicted link(s) from a server of the online service prior to any selection of the predicted link(s) during the networking session.

At operation 730, the initialization system 216 transmits the message to the client device via a network. In some example embodiments, the client device comprises a mobile device. However, other types of client devices are also within the scope of the present disclosure, including, but not limited to, desktop computers and laptop computers.

It is contemplated that any of the other features described within the present disclosure can be incorporated into the method 700.

Figure 8:
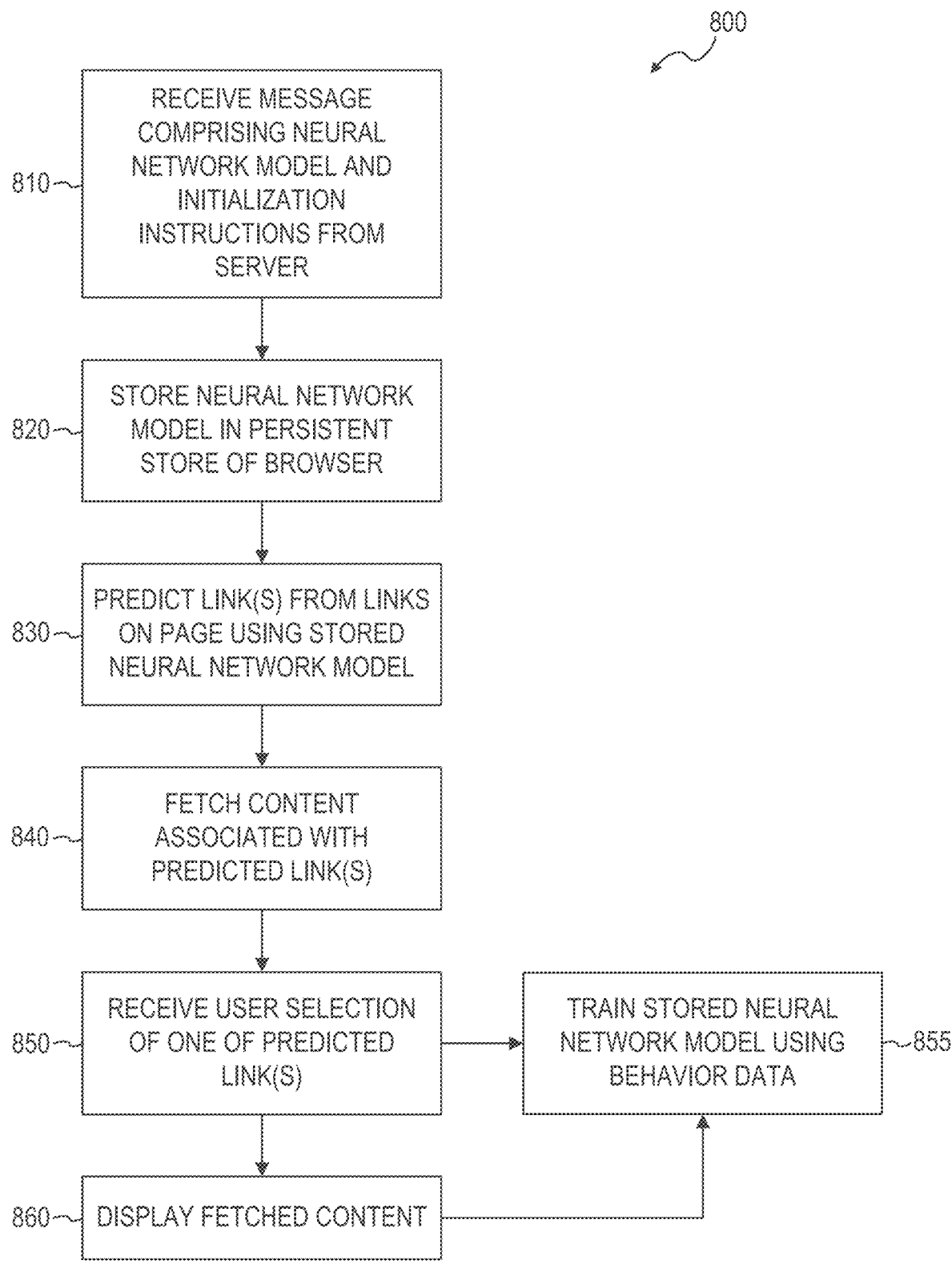
FIG. 8 is a flowchart illustrating a method of pre-fetching content using an in-browser neural network model, in accordance with an example embodiment.

FIG. 8 is a flowchart illustrating a method 800 of pre-fetching content using an in-browser neural network model, in accordance with an example embodiment. The method 800 can be performed by processing logic that can comprise hardware (e.g., circuitry, dedicated logic, programmable logic, microcode, etc.), software (e.g., instructions run on a processing device), or a combination thereof. In one implementation, the method 800 is performed by the pre-fetch system 400 of FIG. 4, or any combination of one or more of its modules, as described above.

At operation 810, the pre-fetch system 400 receives a message from the server (e.g., the server 310 in FIG. 3). In some example embodiments, the message comprises a neural network model (e.g., the neural network model 324 in FIG. 3) and initialization instructions, such as the initialization instructions discussed above. At operation 820, the pre-fetch system 400 stores the neural network model in a persistent store of a browser on the client device on which the pre-fetch system 216 resides. At operation 830, the pre-fetch system 400, during a networking session in which the browser on the client device is accessing a page of an online service, predicts (or select or otherwise identify) at least one link from a plurality of links on the page using the neural network model stored in the persistent store of the browser. At operation 840, the pre-fetch system 400 fetches content associated with the predicted link(s) from a server of the online service prior to any selection of the predicted link(s) during the networking session. At operation 850, the pre-fetch system 400 receives a user selection (e.g., a click or a tap) of one of the predicted link(s) from the user of the client device. At operation 850, the pre-fetch system 400 displays the fetched content within the browser of the client device in response to, or otherwise based on the selection of the one of the predicted link(s).

At operation 855, the pre-fetch system 400 trains the neural network model stored in the persistent store of the browser on the client device using behavior data of the user without transmitting the behavior data to a location external to the client device. In some example embodiments, the behavior data comprises indications of online content displayed to the user within the browser and indications of interactions of the user with the online content within the browser. Such behavior data may include indications of what links were presented to the user and indications of what links the user selected. In this respect, operation 855 may follow operation 850 and use the user selection as behavior data in training the neural network model. The behavior data may also include indications of actions (e.g., likes, comments, shares) the user has taken with respect to the fetched content that has been displayed at operation 860. In some example embodiments, pre-fetch system 400 performs the training of the neural network model within a worker thread of the browser.

It is contemplated that any of the other features described within the present disclosure can be incorporated into the method 800.

Figure 9:
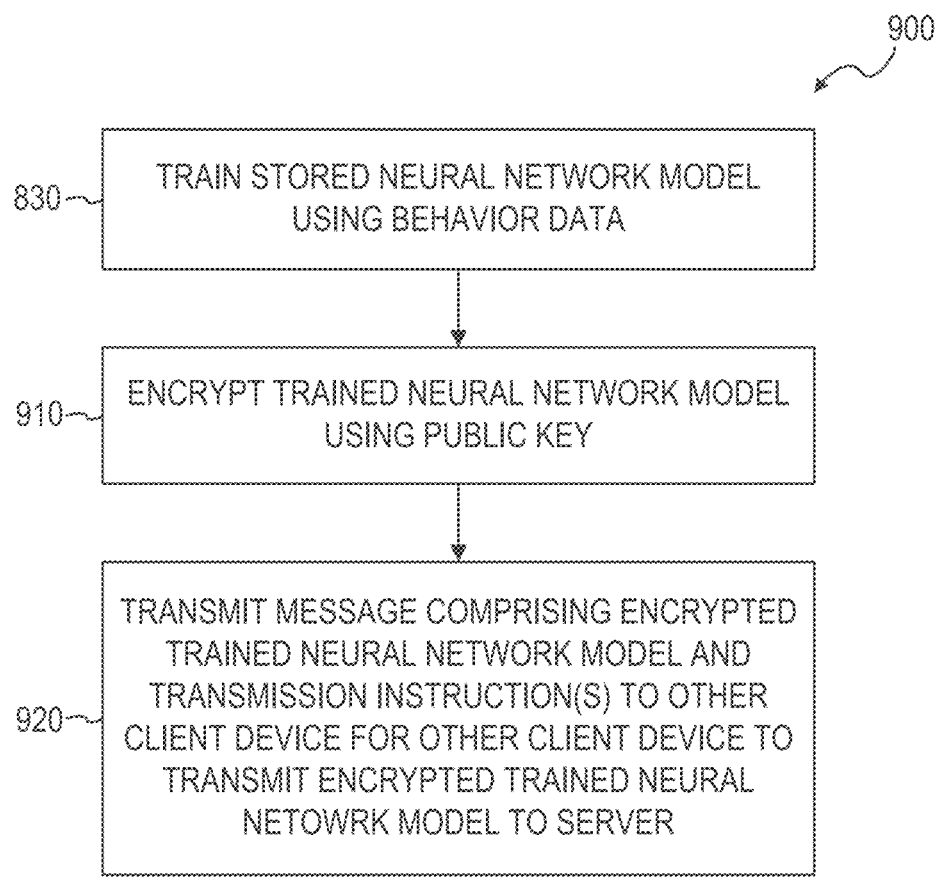
FIG. 9 is a flowchart illustrating a method of transmitting a trained neural network model from a client device to a server, in accordance with an example embodiment.

FIG. 9 is a flowchart illustrating a method 900 of transmitting a trained neural network model from a client device to a server, in accordance with an example embodiment. The method 900 can be performed by processing logic that can comprise hardware (e.g., circuitry, dedicated logic, programmable logic, microcode, etc.), software (e.g. instructions run on a processing device), or a combination thereof. In one implementation, the method 900 is performed by the pre-fetch system 400 of FIG. 4, or any combination of one or more of its modules, as described above.

At operation 910, which may follow operation 830 in FIG. 8, the pre-fetch system 400 encrypts the trained neural network model using a public key. At operation 920, the pre-fetch system 400 transmits a message to another client device of another user that does not have access to the public key. In some example embodiments, the message comprises the encrypted trained neural network model and one or more transmission instructions configured to cause the other client device to transmit the encrypted trained neural network model to a server of the online service.

It is contemplated that any of the other features described within the present disclosure can be incorporated into the method 900.

Figure 10:
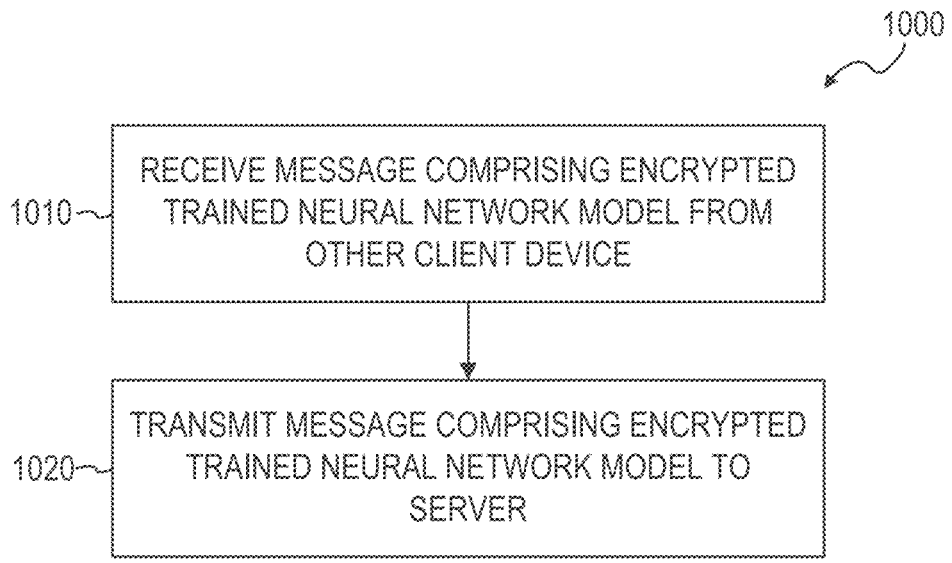
FIG. 10 is a flowchart illustrating another method of transmitting a trained neural network model from a client device to a server, in accordance with an example embodiment.

FIG. 10 is a flowchart illustrating another method 1000 of transmitting a trained neural network model from a client device to a server, in accordance with an example embodiment. The method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the pre-fetch system 400 of FIG. 4, or any combination of one or more of its modules, as described above.

At operation 1010, the pre-fetch system 400 receives a message from another client device. In some example embodiments, the message comprises an encrypted trained neural network model. At operation 1020, the pre-fetch system 400 transmits another message to a server of an online service. In some example embodiments, the other message comprises the encrypted trained neural network model based on the client device receiving the encrypted trained neural network model from the other client device.

It is contemplated that any of the other features described within the present disclosure can be incorporated into the method 1000.

Figure 11:
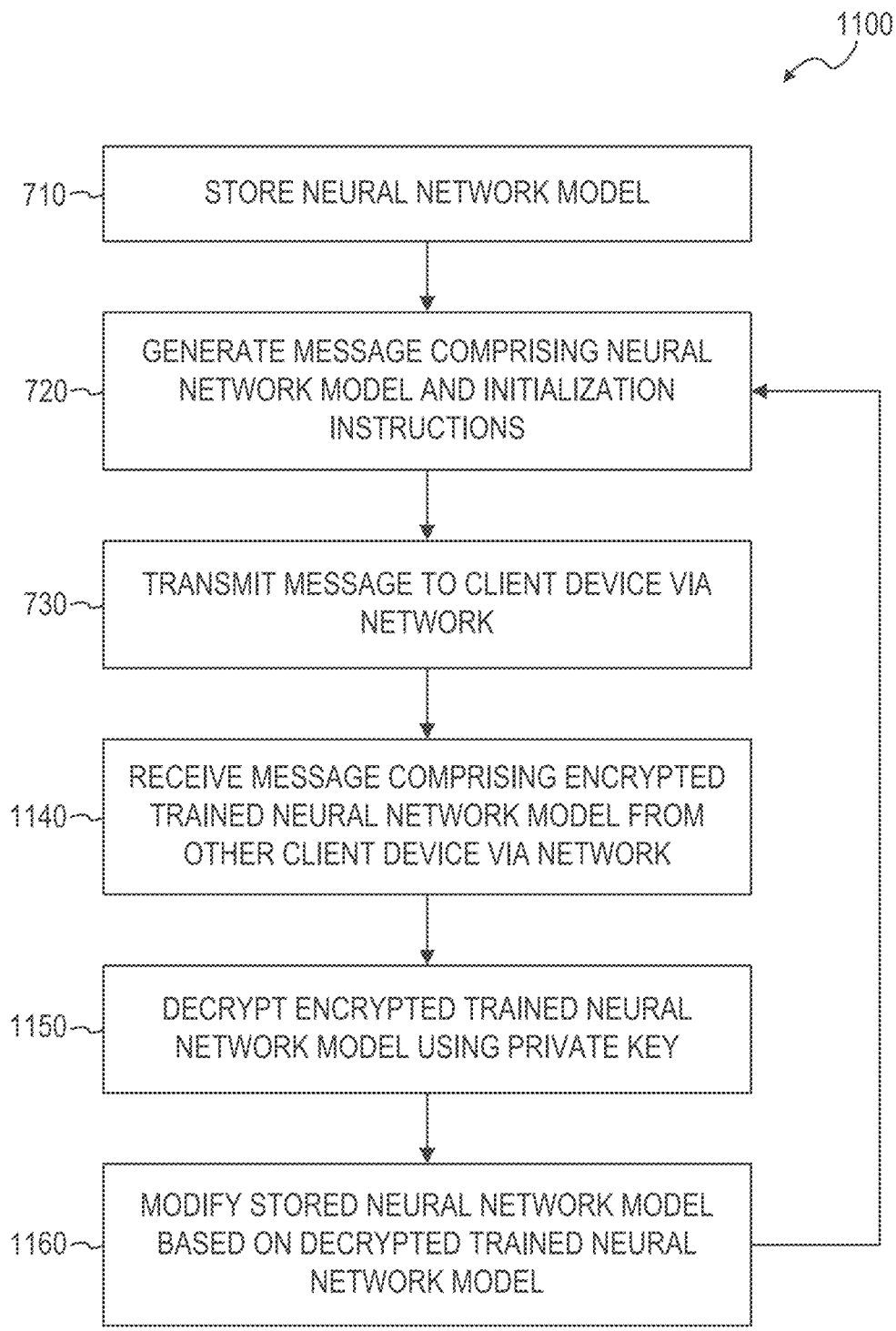
FIG. 11 is a flowchart illustrating a method of using a neural network model trained on a client device to optimize a neural network model stored on a server, in accordance with an example embodiment.

FIG. 11 is a flowchart illustrating a method 1100 of using a neural network model trained on a client device to optimize a neural network model stored on a server, in accordance with an example embodiment. The method 1100 can be performed by processing logic that can comprise hardware (e.g., circuitry, dedicated logic, programmable logic, microcode, etc.), software (e.g., instructions run on a processing device), or a combination thereof. In one implementation, the method 1100 is performed by the initialization system 216 of FIGS. 2-3, or any combination of one or more of its modules, as described above.

In some example embodiments, operation 1140 follows operations 710, 720, and 730 of FIG. 7, and the neural network model stored at operation 710, included in the generated message at operation 720, and transmitted as part of the message at operation 730 comprises a population neural network model. At operation 1140, which may follow operation 730, the initialization system 216 receives a message from a client device via a network. In some example embodiments, the message comprises an encrypted trained neural network model. At operation 1150, the initialization system 216 decrypts the encrypted trained neural network model using a private key. At operation 1160, the initialization system 216 modifies the population neural network model stored on the server based on the decrypted trained neural network model received from the client device. The method 1100 may then return to operation 720, where the initialization system 216 generates a message comprising the modified population neural network model, which may then be transmitted by the initialization system 216 to the client device at operation 730.

It is contemplated that any of the other features described within the present disclosure can be incorporated into the method 1100.

In addition to using the neural network model stored in the persistent store of the browser of the client device to pre-fetch content associated with a link before the user selects the link, in some example embodiments, the pre-fetch system 400 on the client device is also configured to modify content received by the client device from the server using the neural network model stored in the persistent store of the browser of the client device. Such modification of the content may include modifying a display configuration of the content, changing the display configuration provided by the server to a different display configuration that is personalized for the user of the client device using the neural network model stored on the client device of the user. For example, the user may submit a keyword as part of a search query on a search page of an online service. In response to the search query, the server of the online service may transmit hundreds of search results to the client device of the user, with the server dictating a particular order or ranking of the search results. The inference module 420 of the pre-fetch system 400 on the client device may then, using the neural network model, predict that the user would be more interested in or likely to select certain ones of the search results than others. As a result of this prediction by the inference module 420, the display module 420 of the fetch system 400 on the client device may then change the order or ranking of the search results, giving the predicted search results more priority in the order or ranking, thereby displaying the predicted search results in a higher priority position than would have otherwise been the case if the initial order or ranking of the search results provided by the server had been used. Similarly, the neural network model may be used by the client device to re-rank or otherwise modify feed content items received from the server. It is contemplated that the neural network model stored on the client device may be used by the pre-fetch system 400 to modify content provided by the server in other ways as well.

Example Mobile Device

Figure 12:
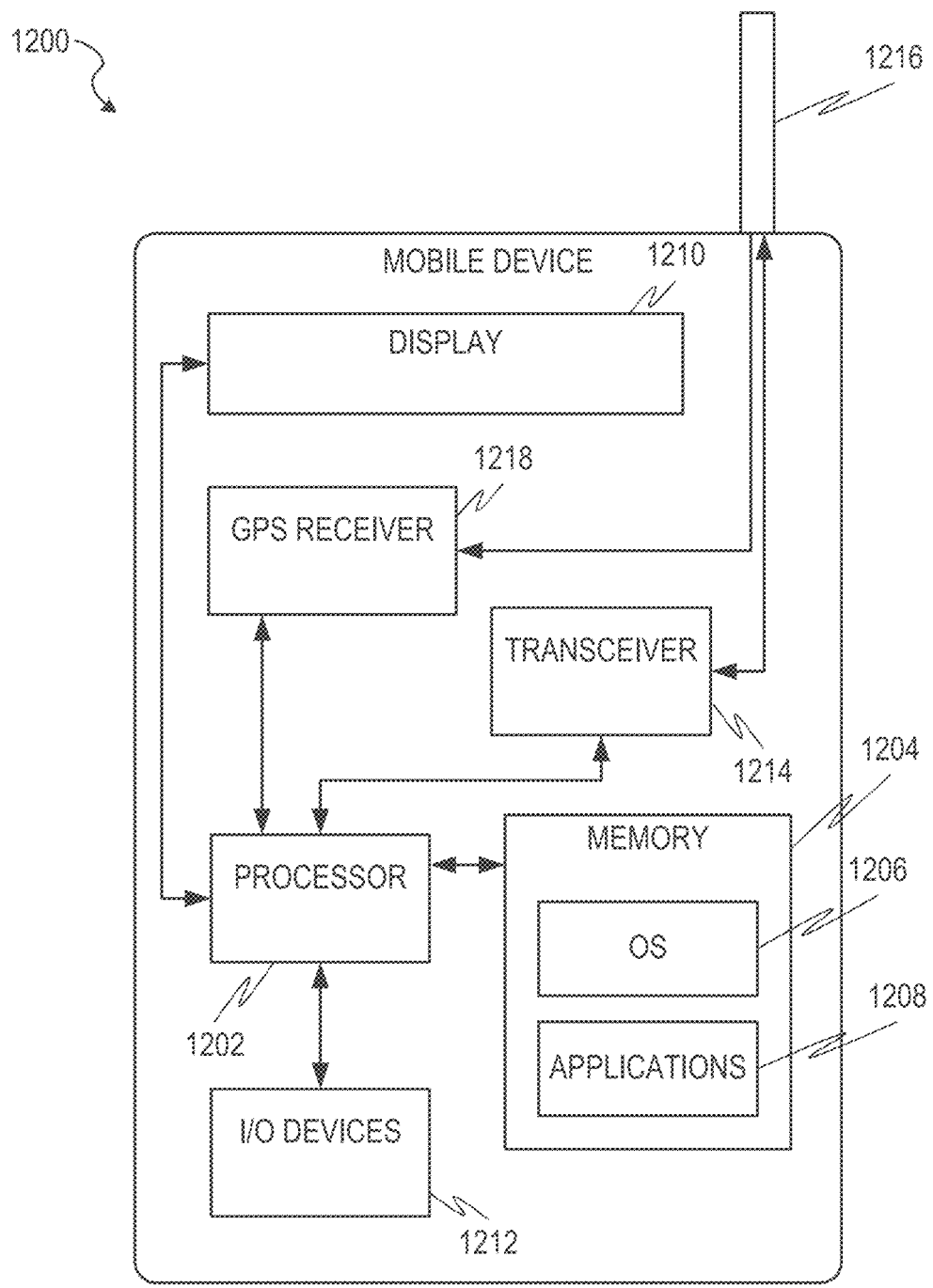
FIG. 12 is a block diagram illustrating a mobile device, in accordance with some example embodiments.

FIG. 12 is a block diagram illustrating a mobile device 1200, according to an example embodiment. The mobile device 1200 can include a processor 1202. The processor 1202 can be any of a variety of different types of commercially available processors suitable for mobile devices 1200 (for example, an XScale architecture microprocessor, a Microprocessor without Interlocked Pipeline Stages (MIPS) architecture processor, or another type of processor). A memory 1204, such as a random access memory (RAM), a Flash memory, or other type of memory, is typically accessible to the processor 1202. The memory 1204 can be adapted to store an operating system (OS) 1206, as well as application programs 1208, such as a mobile location-enabled application that can provide location-based services (LBSs) to a user. The processor 1202 can be coupled, either directly or via appropriate intermediary hardware, to a display 1210 and to one or more input/output (I/O) devices 1212, such as a keypad, a touch panel sensor, a microphone, and the like. Similarly, in some embodiments, the processor 1202 can be coupled to a transceiver 1214 that interfaces with an antenna 1216. The transceiver 1214 can be configured to both transmit and receive cellular network signals, wireless data signals, or other types of signals via the antenna 1216, depending on the nature of the mobile device 1200. Further, in some configurations, a GPS receiver 1218 can also make use of the antenna 1216 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may compose dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
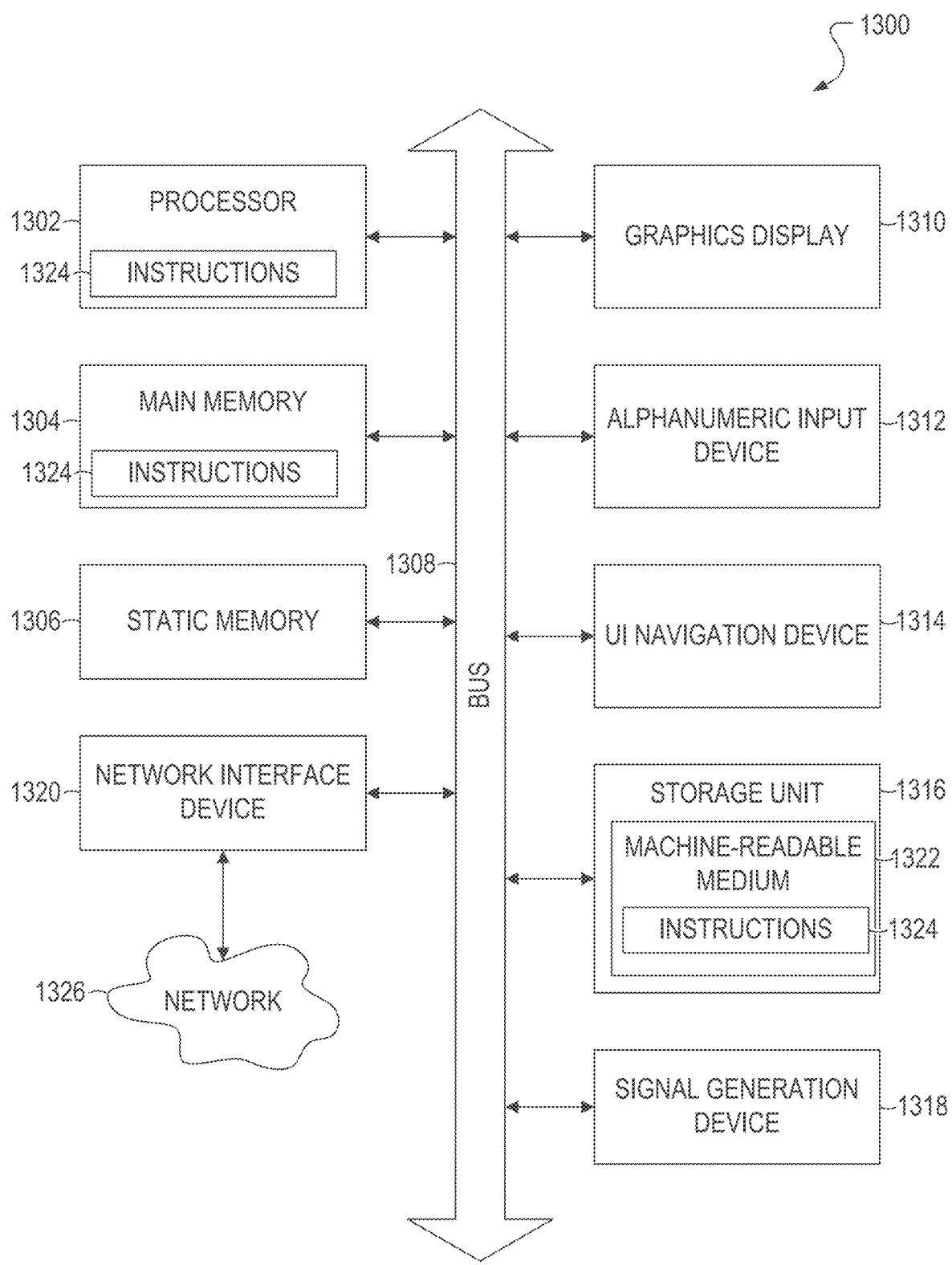
FIG. 13 is a block diagram of air example computer system on which methodologies described herein may be executed, in accordance with an example embodiment.

FIG. 13 is a block diagram of an example computer system 1300 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a graphics display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation device 1314 (e.g., a mouse), a storage unit 1316, a signal generation device 1318 (e.g., a speaker) and a network interface device 1320.

Machine-Readable Medium

The storage unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions (e.g., instructions 1324) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM). Electrically Erasable Programmable Read-Only Memory (EEPROM), and flash memory devices, magnetic disks such as internal hard disks and removable disks, magneto-optical disks, and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method performed by a server of an online service, the computer-implemented method comprising:
    storing a first neural network model;
    generating a first message comprising the first neural network model and first initialization instructions, the first initialization instructions being configured to cause a first client device of a first user to:
        store the first neural network model in a persistent store of a browser on the first client device;
        during a networking session in which the browser on the first client device is accessing a page of the online service, predict at least one link from a plurality of links on the page using the first neural network model stored in the persistent store of the browser; and
        fetch content associated with the predicted at least one link from the server of the online service prior to any selection of the predicted at least one link by the first user during the networking session;
    transmitting the first message to the first client device via a network;
    receiving a second message comprising a second neural network model trained by a second client device of a second user;
    modifying the stored first neural network model based on the received second neural network model; and
    transmitting the modified first neural network model to another client device of another user.

2. The computer-implemented method of claim 1, wherein the first initialization instructions are further configured to cause the first client device to train the first neural network model using behavior data of the first user without transmitting the behavior data to a location external to the first client device, the behavior data comprising indications of online content displayed to the first user within the browser and indications of actions of the first user with the online content within the browser.

3. The computer-implemented method of claim 2, wherein the first initialization instructions are further configured to cause the first client device to perform the training of the first neural network model within a worker thread of the browser.

4. The computer-implemented method of claim 2, wherein the first initialization instructions are further configured to cause the first client device to:
    encrypt the trained first neural network model using a public key; and
    transmit another message to the second client device of the second user, the second user not having access to the public key, the another message comprising the encrypted trained first neural network model and one or more transmission instructions configured to cause the second client device to transmit the encrypted trained first neural network model to the server of the online service.

5. The computer-implemented method of claim 1, wherein the first initialization instructions are further configured to cause the first client device to transmit the second message comprising the second neural network model trained and encrypted by the second client device of the second user to the server of the online service based on the first client device receiving the trained and encrypted second neural network model from the second client device.

6. The computer-implemented method of claim 5, wherein the first neural network model comprises a population neural network model, and the method further comprises:
    decrypting the trained and encrypted second neural network model using a public key;
    modifying the population neural network model based on the decrypted trained neural network model;
    generating a third message comprising the modified population neural network model; and
    transmitting the third message to a third client device of a third user via the network.

7. The computer-implemented method of claim 1, wherein the first neural network model comprises a deep neural network model.

8. The computer-implemented method of claim 1, wherein the first client device comprises a mobile device.

9. The computer-implemented method of claim 1, wherein the online service comprises a social networking service.

10. The computer-implemented method of claim 1, wherein the content comprises at least one of a page, a document, textual data, image data, video data, and audio data.

11. A system comprising:
    at least one hardware processor of a server of an online service; and
    a non-transitory machine-readable medium embodying a set of instructions that, when executed by the at least one hardware processor, cause the at least one processor to perform operations, the operations comprising:
        storing a first neural network model;

generating a first message comprising the first neural network model and first initialization instructions, the first initialization instructions being configured to cause a first client device of a first user to:
  store the first neural network model in a persistent store of a browser on the first client device;
  during a networking session in which the browser on the first client device is accessing a page of the online service, identify at least one link from a plurality of links on the page using the first neural network model stored in the persistent store of the browser; and
  fetch content associated with the identified at least one link from the server of the online service prior to any selection of the identified at least one link by the first user during the networking session;
transmitting the first message to the first client device via a network;
receiving a second message comprising a second neural network model trained by a second client device of a second user;
modifying the stored first neural network model based on the received second neural network model; and
transmitting the modified first neural network model to another client device of another user.

12. The system of claim 11, wherein the first initialization instructions are further configured to cause the first client device to train the first neural network model using behavior data of the first user without transmitting the behavior data to a location external to the first client device, the behavior data comprising indications of online content displayed to the first user within the browser and indications of actions of the first user with the online content within the browser.

13. The system of claim 12, wherein the first initialization instructions are further configured to cause the first client device to perform the training of the first neural network model within a worker thread of the browser.

14. The system of claim 12, wherein the first initialization instructions are further configured to cause the first client device to:
  encrypt the trained first neural network model using a public key; and
  transmit another message to the second client device of the second user, the second user not having access to the public key, the another message comprising the encrypted trained first neural network model and one or more transmission instructions configured to cause the second client device to transmit the encrypted trained first neural network model to the server of the online service.

15. The system of claim 11, wherein the first initialization instructions are further configured to cause the first client device to transmit the second message comprising the second neural network model trained and encrypted by second client device of the second user to the server of the online service based on the first client device receiving the trained and encrypted second neural network model from the second client device.

16. The system of claim 15, wherein the first neural network model comprises a population neural network model, and the operations further comprise:

decrypting the trained and encrypted second neural network model using a public key;
modifying the population neural network model based on the decrypted trained neural network model;
generating a third message comprising the modified population neural network model; and
transmitting the third message to a third client device of a third user via the network.

17. The system of claim 11, wherein the first neural network model comprises a deep neural network model.

18. A non-transitory machine-readable medium embodying a set of instructions that, when executed by at least one hardware processor of a server of an online service, cause the at least one hardware processor to perform operations, the operations comprising:
storing a first neural network model;
generating a first message comprising the first neural network model and first initialization instructions, the first initialization instructions being configured to cause a first client device of a first user to:
  store the first neural network model in a persistent store of a browser on the first client device;
  during a networking session in which the browser on the first client device is accessing a page of the online service, select at least one link from a plurality of links on the page using the first neural network model stored in the persistent store of the browser; and
  fetch content associated with the selected at least one link from the server of the online service prior to any selection of the selected at least one link by the first user during the networking session;
transmitting the first message to the first client device via a network;
receiving a second message comprising a second neural network model trained by a second client device of a second user;
modifying the stored first neural network model based on the received second neural network model; and
transmitting the modified first neural network model to another client device of another user.

19. The non-transitory machine-readable medium of claim 18, wherein the first initialization instructions are further configured to cause the first client device to train the first neural network model using behavior data of the first user without transmitting the behavior data to a location external to the first client device, the behavior data comprising indications of online content displayed to the first user within the browser and indications of actions of the first user with the online content within the browser.

20. The non-transitory machine-readable medium of claim 18, wherein the first initialization instructions are further configured to cause the first client device to:
  receive a plurality of content items from the server of the online service, the plurality of content items having a ranking as received from the server;
  modify the ranking of the plurality of content items using the first neural network model stored in the persistent store of the browser; and
  display at least a portion of the plurality of content items based on the modified ranking.

* * * * *